(12) United States Patent
Kotecha et al.

(10) Patent No.: US 8,824,395 B2
(45) Date of Patent: Sep. 2, 2014

(54) DYNAMIC SELECTION OF HOST-BASED OR NETWORK-BASED MOBILITY PROTOCOL

(75) Inventors: Lalit R. Kotecha, San Ramon, CA (US); Sergio Aguirre, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 310 days.

(21) Appl. No.: 13/280,845

(22) Filed: Oct. 25, 2011

(65) Prior Publication Data

US 2013/0100894 A1    Apr. 25, 2013

(51) Int. Cl.
*H04L 12/28*   (2006.01)
*H04W 4/00*   (2009.01)
*G06F 15/16*   (2006.01)

(52) U.S. Cl.
USPC ............ 370/329; 370/331; 370/401; 709/230

(58) Field of Classification Search
USPC .......... 370/254–338, 352–401; 709/203–206, 709/222–229; 455/436–445
See application file for complete search history.

(56) References Cited

U.S. PATENT DOCUMENTS

| | | | |
|---|---|---|---|
| 7,245,917 B2 * | 7/2007 | Chiueh | 455/442 |
| 8,068,840 B2 * | 11/2011 | Patel et al. | 455/439 |
| 8,379,573 B2 * | 2/2013 | Kim et al. | 370/328 |
| 8,379,599 B2 * | 2/2013 | Velev et al. | 370/331 |
| 8,385,285 B2 * | 2/2013 | Haddad | 370/329 |
| 8,391,242 B2 * | 3/2013 | Velev et al. | 370/331 |
| 8,483,179 B2 * | 7/2013 | Jain | 370/331 |
| 8,498,268 B1 * | 7/2013 | Faccin et al. | 370/331 |
| 8,503,460 B2 * | 8/2013 | Ahmavaara | 370/401 |
| 8,510,455 B2 * | 8/2013 | Xia et al. | 709/230 |
| 2010/0046434 A1 * | 2/2010 | Weniger et al. | 370/328 |
| 2010/0061304 A1 * | 3/2010 | Aramoto et al. | 370/328 |
| 2010/0157947 A1 * | 6/2010 | Hernandez-Mondragon et al. | 370/331 |
| 2010/0201222 A1 * | 8/2010 | Adachi et al. | 310/317 |
| 2010/0296481 A1 * | 11/2010 | Weniger et al. | 370/331 |
| 2011/0173330 A1 * | 7/2011 | Gong et al. | 709/226 |
| 2012/0069797 A1 * | 3/2012 | Lim et al. | 370/328 |
| 2012/0207090 A1 * | 8/2012 | Melia et al. | 370/328 |
| 2013/0121206 A1 * | 5/2013 | Turanyi et al. | 370/254 |

* cited by examiner

*Primary Examiner* — Man Phan

(57) ABSTRACT

A device receives, from a mobile device, a request to connect to a network, and determines, based on the connection request, whether the mobile device has mobility capability. The device registers the mobile device per host-based mobility protocol standards when the mobile device does not have mobility capability. The device registers the mobile device per network-based mobility protocol standards when the mobile device has mobility capability.

20 Claims, 10 Drawing Sheets

DYNAMIC SELECTION OF HOST-BASED OR NETWORK-BASED MOBILITY PROTOCOL

BACKGROUND

Network protocols that support mobility aim at ensuring appropriate forwarding of traffic as a mobile device changes its network attachment point and/or technology used to gain access to a network. To ensure that an acceptable quality of experience is observed by the mobile device, and considering different available applications, each traffic component requires appropriate treatment per a corresponding class of service. For a typical mobile device, application traffic is carried over multiple networks. Appropriate treatment is required on each network node along a path on which traffic will be forwarded. Mobile Internet protocol (IP) allows mobile devices to continue receiving traffic wherever the mobile devices are attached to the Internet. Mobile IP enables the mobile devices (also known as IP hosts, mobile hosts, or mobile nodes) to move between different sub-networks without tearing down established transport layer sessions.

Some third generation (3G) wireless access networks, such as code division multiple access (CDMA) networks, use Mobile IP version 4 (v4) or Client Mobile IP version 4 (CMIPv4) as a mobility protocol. CMIPv4 is a host-based mobility protocol where a mobile device executes a mobility client, implements a CMIPv4 protocol stack, and manages mobility. A network node in a CDMA network supports the mobility of the mobile devices via two agents, a foreign agent (FA) (e.g., a packet data serving node (PDSN)) and a home agent (HA). When a mobile device connects to a CDMA network, the FA sends an agent advertisement message so that the mobile device knows it is connecting to a network that supports CMIPv4-based mobility. Based on the agent advertisement message, the mobile device executes a CMIPv4 client and begins performing a Mobile IP registration.

Next generation CDMA networks and fourth generation (4G) wireless standards provided by The Third Generation Partnership Project (3GPP) specify use of a network-based mobility protocol called proxy Mobile IP version 6 (PMIPv6). In a PMIPv6 based network, a mobile device uses a Simple IP address to communicate and mobility is handled by the network. The mobile device may be transparent or unaware of such mobility.

The CMIPv4 and PMIPv6 mobility protocols specify how to use host-based mobility and network-based mobility, respectively. However, current mobility standards do not address networks that implement both the CMIPv4 and PMIPv6 mobility protocols. Furthermore, current mobility standards do enable dynamic selection of either the CMIPv4 mobility protocol or the PMIPv6 mobility protocol, depending on the mobility capability of the mobile device.

DETAILED DESCRIPTION OF PREFERRED EMBODIMENTS

The following detailed description refers to the accompanying drawings. The same reference numbers in different drawings may identify the same or similar elements.

Systems and/or methods described herein may provide for dynamic selection of a host-based or a network-based mobility protocol in mixed mobility environments, such as networks that implement both the CMIPv4 and PMIPv6 mobility protocols. The systems and/or methods may enable a mobile device and a network to exchange mobility capabilities so that the network may select a correct type of mobility protocol for the duration of a mobile session with the mobile device.

In one example implementation, the systems and/or methods may determine, via a connection request, a mobility capability of a mobile device. If the mobile device fails to provide a mobility capability (i.e., supports Mobile IP), the systems and/or methods may determine that the mobile device is a legacy device, and may provide a Mobile IP agent advertisement to the mobile device. The systems and/or methods may register the mobile device per host-based mobility standards. If the mobile device provides a mobility capability (i.e., supports Simple IP), the systems and/or methods may determine that the mobile device is an enhanced device, and may wait for the mobile device to request an IP address. The systems and/or methods may register the mobile device per network-based mobility standards.

As used herein, the terms "subscriber" and/or "user" may be used interchangeably. Also, the terms "subscriber" and/or "user" are intended to be broadly interpreted to include a mobile device, or a user of a mobile device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
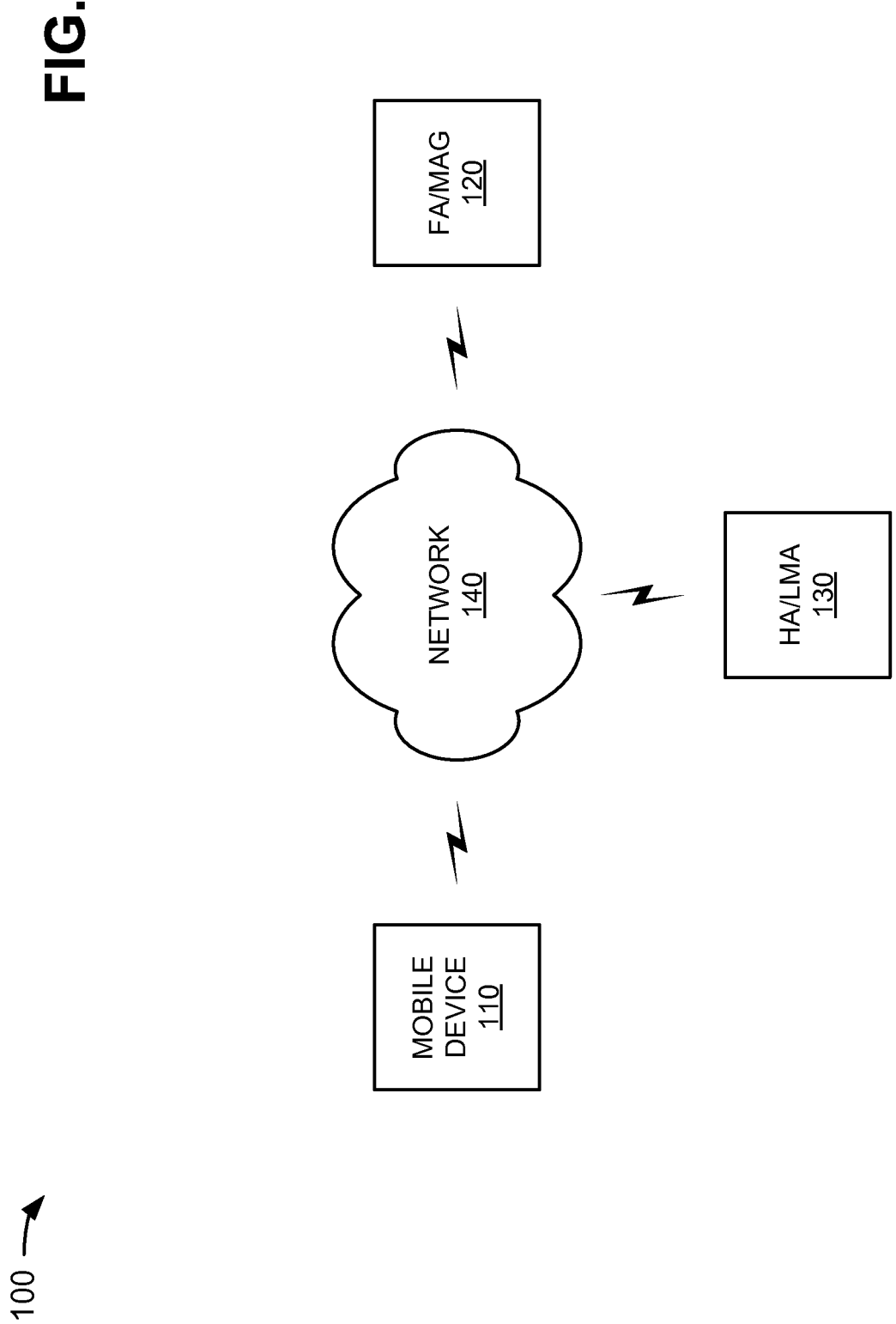
FIG. 1 is a diagram of an example network in which systems and/or methods described herein may be implemented.

FIG. 1 is a diagram of an example network 100 in which systems and/or methods described herein may be implemented. As illustrated, network 100 may include a mobile device 110, a foreign agent (FA)/mobile access gateway (MAG) 120, and a home agent (HA)/local mobility anchor (LMA) 130 interconnected by a network 140. Devices and/or networks of network 100 may interconnect via wired and/or wireless connections. A single mobile device 110, FA/MAG 120, HA/LMA 130, and network 140 have been illustrated in FIG. 1 for simplicity. In practice, there may be more mobile devices 110, FA/MAGs 120, HA/LMAs 130, and/or networks 140 than depicted in FIG. 1.

Mobile device 110 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; or other types of computation and/or communication devices. In one example, mobile device 110 may include an Internet-connected device (e.g., a "mobile node" or "mobile host") whose location and point of attachment to the Internet may frequently change. In one example implementation, mobile device 110 may be referred to herein as a "legacy device" when mobile device 110 provides support for only a host-based mobility protocol, such as the CMIPv4 mobility protocol (i.e., supports Mobile IP). Alternatively, mobile device 110 may be referred to herein as an "enhanced device" when mobile device 110 provides support for a network-based mobility protocol (e.g., the PMIPv6 mobility protocol, i.e., supports Simple IP) or provides support for a host-based mobility protocol (e.g., the CMIPv4 mobility protocol) and the network-based mobility protocol.

FA/MAG 120 may include one or more computation and/or communication devices, that gather, process, search, and/or provide information in a manner described herein. In one example implementation, FA/MAG 120 may include a network device, such as a gateway, a router, a switch, a firewall, a network interface card (NIC), a hub, a bridge, a proxy server, or some other type of device that processes and/or transfers traffic. FA/MAG 120 may store information about mobile devices (e.g., mobile device 110) visiting network 140. FA/MAG 120 may advertise care-of-addresses (e.g., physical IP addresses of mobile devices operating in a foreign network) that may be used by mobile device 110. As mobile device 110 connects to network 140, FA/MAG 120 may check host authorization and may update HA/LMA 130 about the current location of a host. FA/MAG 120 and HA/LMA 130 may then create a bi-directional tunnel.

HA/LMA 130 may include one or more computation and/or communication devices, that gather, process, search, and/or provide information in a manner described herein. In one example implementation, HA/LMA 130 may include a network device, such as a gateway, a router, a switch, a firewall, a NIC, a hub, a bridge, a proxy server, or some other type of device that processes and/or transfers traffic. HA/LMA 130 may maintain information about a current location of mobile device 110 (e.g., as identified in a care-of address or current point of attachment of mobile device 110). HA/LMA 130 may use tunneling mechanisms to forward traffic so that the IP address of mobile device 110 does not have to be changed each time mobile device 110 connects from a different location.

Network 140 may include a local area network (LAN), a wide area network (WAN), a metropolitan area network (MAN), a telephone network, such as the Public Switched Telephone Network (PSTN), a Wi-Fi network, an intranet, the Internet, an optical fiber (or fiber optic)-based network, or a combination of networks. In one example implementation, network 140 may include a network that supports a Mobile IPv4 and/or a proxy Mobile IPv6 regional registration environment.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
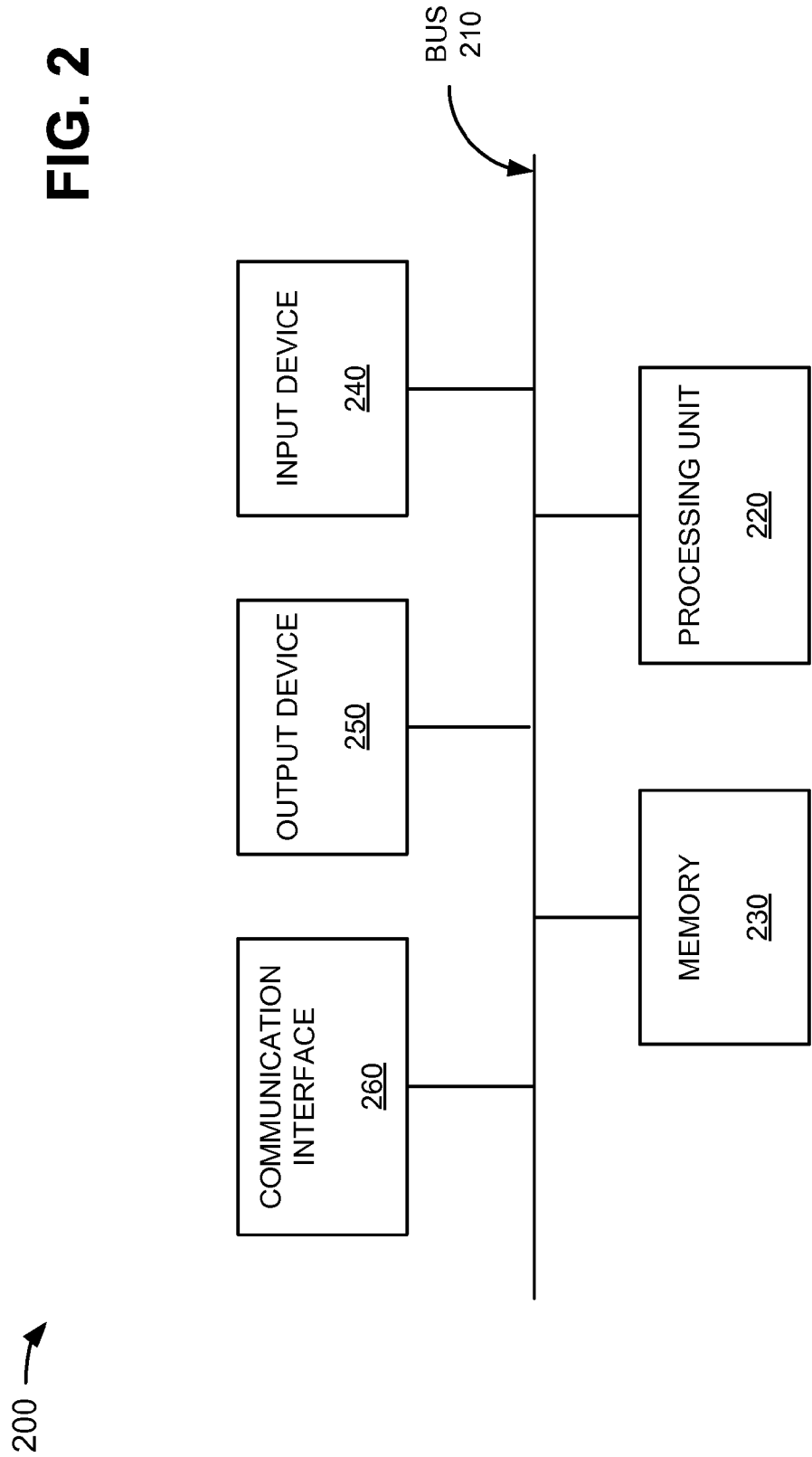
FIG. 2 is a diagram of example components of a device that may correspond to one or more devices of the network depicted in FIG. 1.

FIG. 2 is a diagram of example components of a device 200 that may correspond to one or more devices (e.g., mobile device 110) of network 100 (FIG. 1). In one example implementation, one or more of the devices of network 100 may include one or more devices 200 or one or more components of device 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
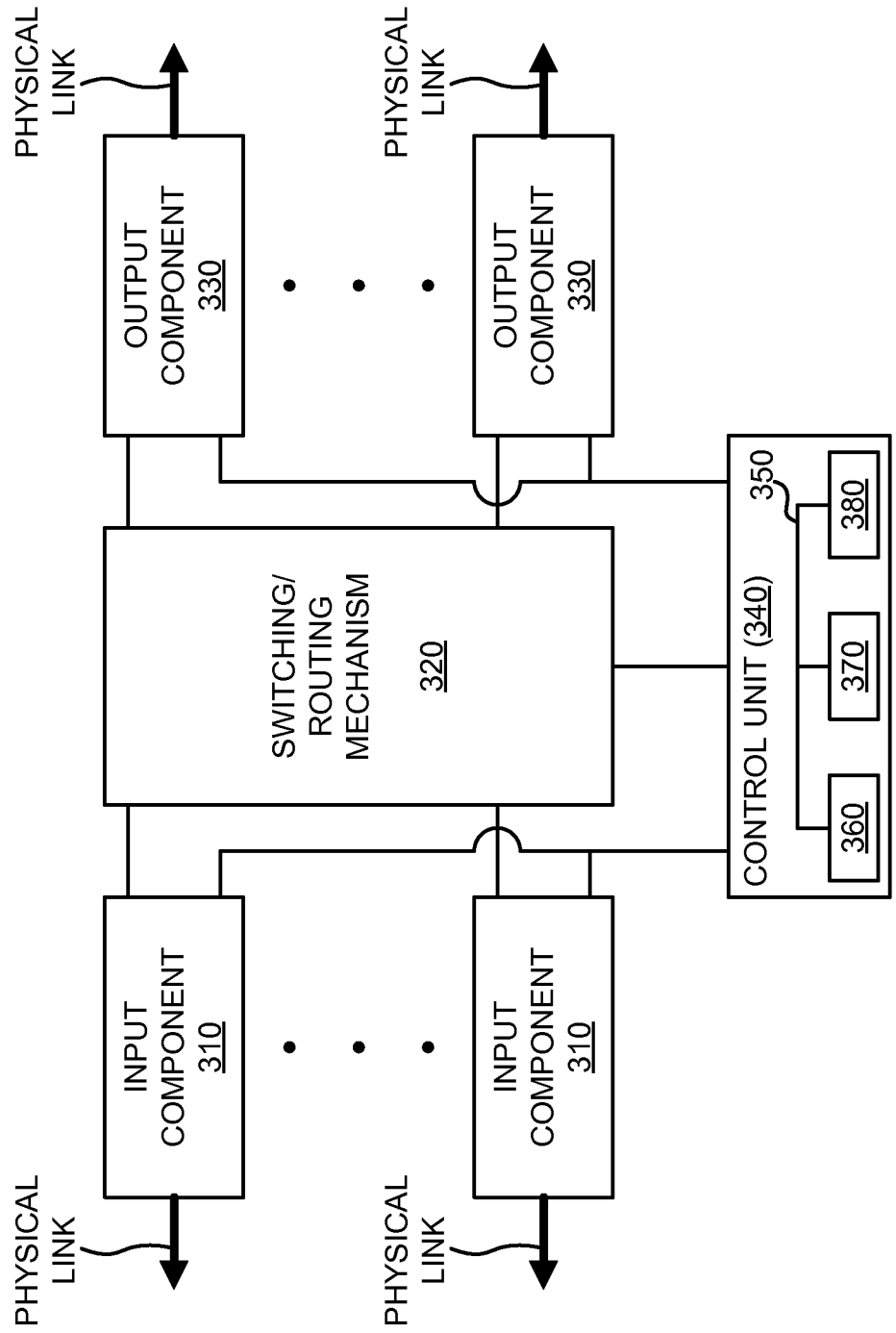
FIG. 3 is a diagram of example components of a device that may correspond to one or more devices of the network depicted in FIG. 1.

FIG. 3 is a diagram of example components of a device 300 that may correspond to one or more devices (e.g., FA/MAG 120 and/or HA/LMA 130) of network 100 (FIG. 1). In one example implementation, one or more of the devices of network 100 may include one or more devices 300 or one or more components of device 300. As shown in FIG. 3, device 300 may include input components 310, a switching/routing mechanism 320, output components 330, and a control unit 340.

Input components 310 may be a point of attachment for physical links and may be a point of entry for incoming traffic, such as packets. Input components 310 may process incoming traffic, such as by performing data link layer encapsulation or decapsulation. In an example implementation, input components 310 may send and/or receive packets.

Switching/routing mechanism 320 may interconnect input components 310 with output components 330. Switching/routing mechanism 320 may be implemented using many different techniques. For example, switching/routing mechanism 320 may be implemented via busses, via crossbars, and/or with shared memories. The shared memories may act as temporary buffers to store traffic from input components 310 before the traffic is eventually scheduled for delivery to output components 330.

Output components 330 may store packets and may schedule packets for service on output physical links Output components 330 may include scheduling algorithms that support priorities and guarantees. Output components 330 may support data link layer encapsulation and decapsulation, and/or a variety of higher-level protocols. In an example implementation, output components 330 may send packets and/or receive packets.

Control unit 340 may use routing protocols and one or more forwarding tables for forwarding packets. Control unit 340 may connect with input components 310, switching/routing mechanism 320, and output components 330. Control unit 340 may compute a forwarding table, implement routing protocols, and/or run software to configure and manage device 300. Control unit 340 may determine routing for any packet whose destination address may not be found in the forwarding table.

In an example implementation, control unit 340 may include a bus 350 that may include a path that permits communication among a processor 360, a memory 370, and a communication interface 380. Processor 360 may include one or more processors, microprocessors, ASICs, FPGAs, or other types of processing units that may interpret and execute instructions. Memory 370 may include a RAM, a ROM device, a magnetic and/or optical recording medium and its corresponding drive, and/or another type of static and/or dynamic storage device that may store information and instructions for execution by processor 360. Memory 370 may also temporarily store incoming traffic (e.g., a header of a packet or an entire packet) from input components 310, for processing by processor 360, before a packet is directed back to switching/routing mechanism 320, transported by switching/routing mechanism 320, and eventually scheduled to be sent to output components 330. Communication interface 380 may include any transceiver-like mechanism that enables control unit 340 to communicate with other devices and/or systems.

As described herein, device 300 may perform certain operations in response to processor 360 executing software instructions contained in a computer-readable medium, such as memory 370. The software instructions may be read into memory 370 from another computer-readable medium, such as a data storage device, or from another device via communication interface 380. The software instructions contained in memory 370 may cause processor 360 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
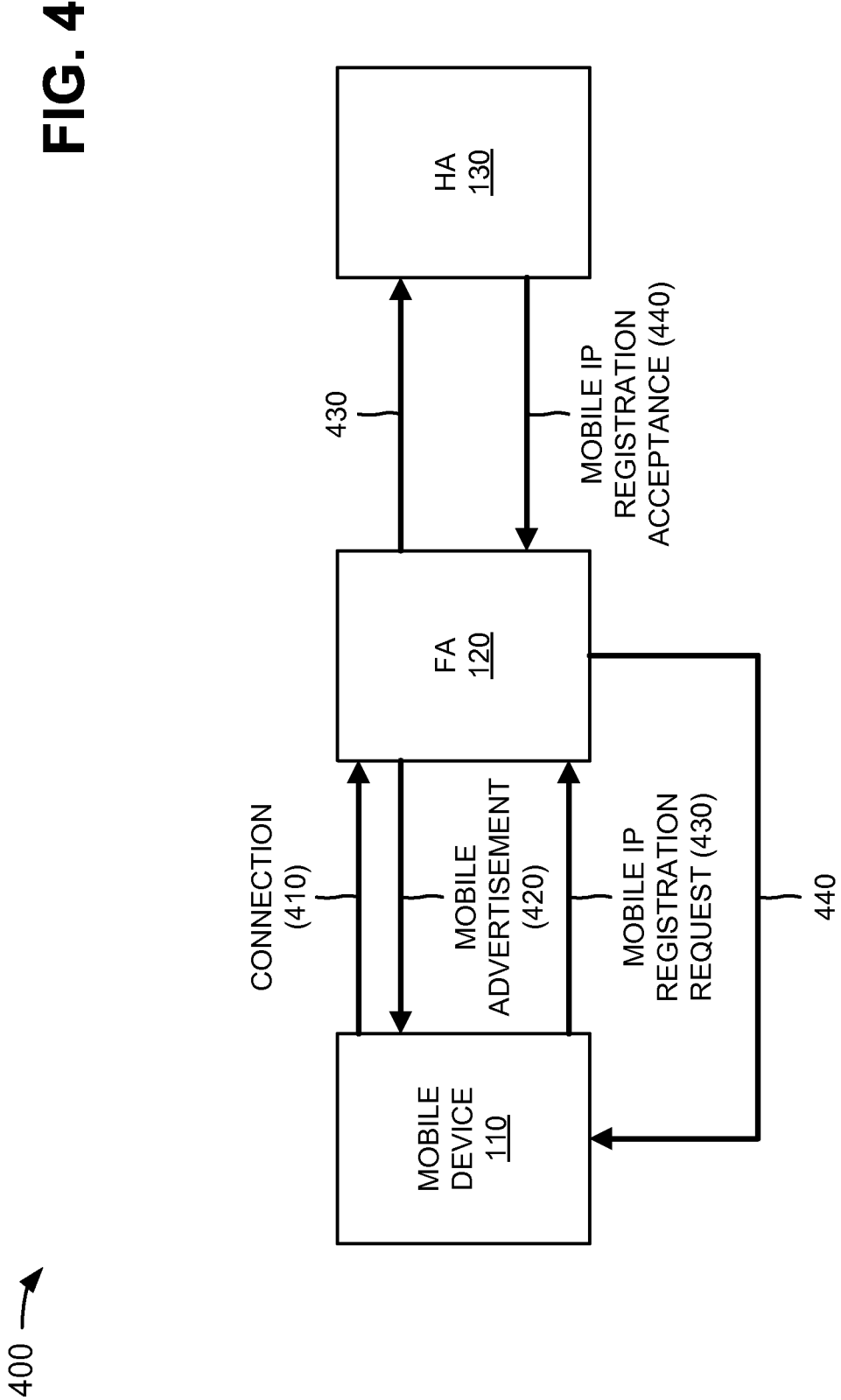
FIG. 4 is a diagram of example Mobile IP 3G operations capable of being performed by an example portion of the network in FIG. 1.

FIG. 4 is a diagram of example Mobile IP 3G operations capable of being performed by an example portion 400 of network 100 (FIG. 1). As shown, network portion 400 may include mobile device 110, FA 120, and HA 130. Mobile device 110, FA 120, and HA 130 may include the features described above in connection with, for example, one or more of FIGS. 1-3. In one example, network portion 400 may support the CMIPv4 mobility protocol.

As further shown in FIG. 4, mobile device 110 may generate a connection request 410, and may provide connection request 410 to FA 120. Connection request 410 may include a request to connect to an access network (e.g., network 140), such as a CDMA access network. FA 120 may receive connection request 410, and may provide a mobile advertisement message 420 to mobile device 110 based on connection request 410. Mobile advertisement message 420 may provide an indication that network portion 400 supports the CMIPv4 mobility protocol.

Mobile device 110 may receive mobile advertisement message 420, and may begin a Mobile IP registration process based on mobile advertisement message 420. For example, mobile device 110 may provide a Mobile IP registration request 430 to FA 120, and FA 120 may forward Mobile IP registration request 430 to HA 130. Mobile IP registration request 430 may include a request for an IP address. HA 130 may receive Mobile IP registration request 430, and may return, to FA 120, a Mobile IP registration acceptance 440 in response to Mobile IP registration request 430. Mobile IP registration acceptance 440 may include an IP address assigned by HA 130 to mobile device 110. FA 120 may forward Mobile IP registration acceptance 440 to mobile device 110 so that mobile device 110 may receive and utilize the assigned IP address.

Although FIG. 4 shows example components of network portion 400, in other implementations, network portion 400 may include fewer components, different components, differently arranged components, or additional components than depicted in FIG. 4. Additionally, or alternatively, one or more components of network portion 400 may perform one or more other tasks described as being performed by one or more other components of network portion 400.

Figure 5:
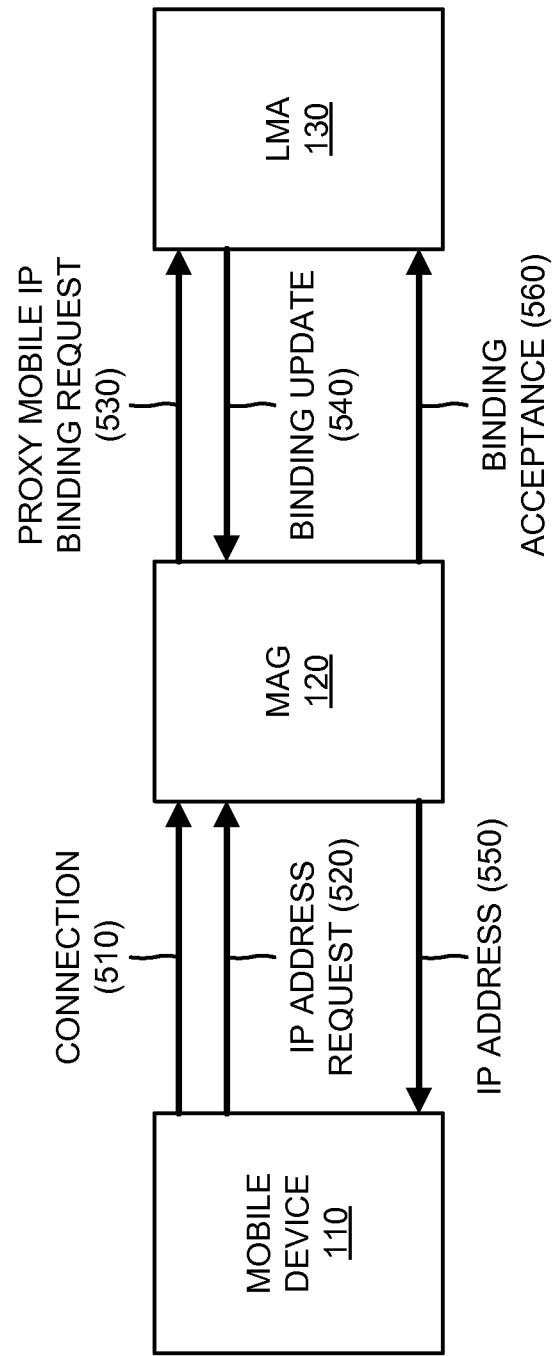
FIG. 5 is a diagram of example proxy Mobile IP operations capable of being performed by another example portion of the network in FIG. 1.

FIG. 5 is a diagram of example proxy Mobile IP operations capable of being performed by another example portion 500 of network 100 (FIG. 1). As shown, network portion 500 may include mobile device 110, MAG 120, and LMA 130. Mobile device 110, MAG 120, and LMA 130 may include the features described above in connection with, for example, one or more of FIGS. 1-4. In one example, network portion 500 may support the PMIPv6 mobility protocol.

As further shown in FIG. 5, mobile device 110 may generate a connection request 510, and may provide connection request 510 to MAG 120. Connection request 510 may include a request to connect to an access network (e.g., network 140), such as an access network that supports a network-based mobility protocol. Mobile device 110 may also generate an IP address request 520, and may provide IP address request 520 to MAG 120. In one example, IP address request 520 may be included in connection request 510. MAG 120 may receive connection request 510 and IP address request 520, and may act as a proxy agent for mobile device 110 based on connection request 510 and/or IP address request 520.

For example, MAG 120 may generate and provide a proxy Mobile IP binding request 530 to LMA 130, based on connection request 510 and/or IP address request 520. Proxy Mobile IP binding request 530 may include a request for an IP address for mobile device 110. LMA 130 may receive proxy Mobile IP binding request 530, and may return, to MAG 120, a proxy Mobile IP binding update 540 in response to proxy Mobile IP binding request 530. Proxy Mobile IP binding update 540 may include an IP address 550 assigned by LMA 130 to mobile device 110. MAG 120 may forward IP address 550 to mobile device 110 so that mobile device 110 may utilize IP address 550. In one example, MAG 120 may deliver IP address 550 to mobile device 110 using a Layer 2 (e.g., of the Open Systems Interconnection (OSI) model) method or a dynamic host configuration protocol (DHCP) method. As further shown in FIG. 5, MAG 120 may provide, to LMA 130, a proxy Mobile IP binding acceptance 560 that provides an indication of acceptance of proxy Mobile IP binding update 540.

Although FIG. 5 shows example components of network portion 500, in other implementations, network portion 500 may include fewer components, different components, differently arranged components, or additional components than depicted in FIG. 5. Additionally, or alternatively, one or more components of network portion 500 may perform one or more other tasks described as being performed by one or more other components of network portion 500.

In one example implementation, FIG. 4 may depict operations to be performed by a network when only a host-based mobility protocol (e.g., the CMIPv4 mobility protocol) is supported by the network. FIG. 5 may depict operations to be performed by a network when only a network-based mobility protocol (e.g., the PMIPv6 mobility protocol) is supported by the network. However, mixed mobility networks may support both the host-based mobility protocol and the network-based mobility protocol. When mobile device 110 connects to a mixed mobility network, the mixed mobility network may not know whether mobile device 110 is capable of supporting the host-based mobility protocol and/or the network-based mobility protocol.

Figure 6:
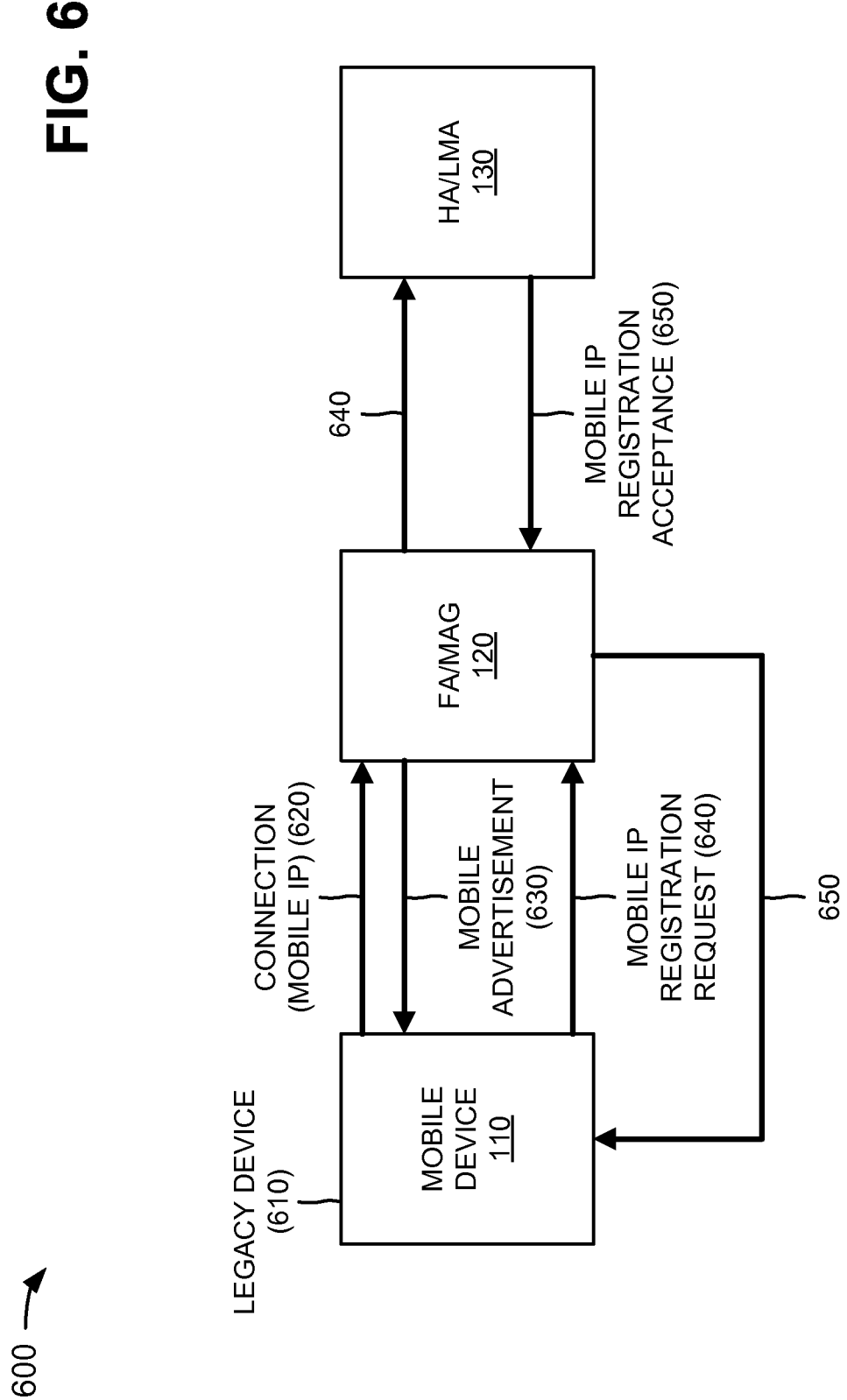
FIG. 6 is a diagram of example host-based dynamic selection operations capable of being performed by still another example portion of the network in FIG. 1.
Figure 7:
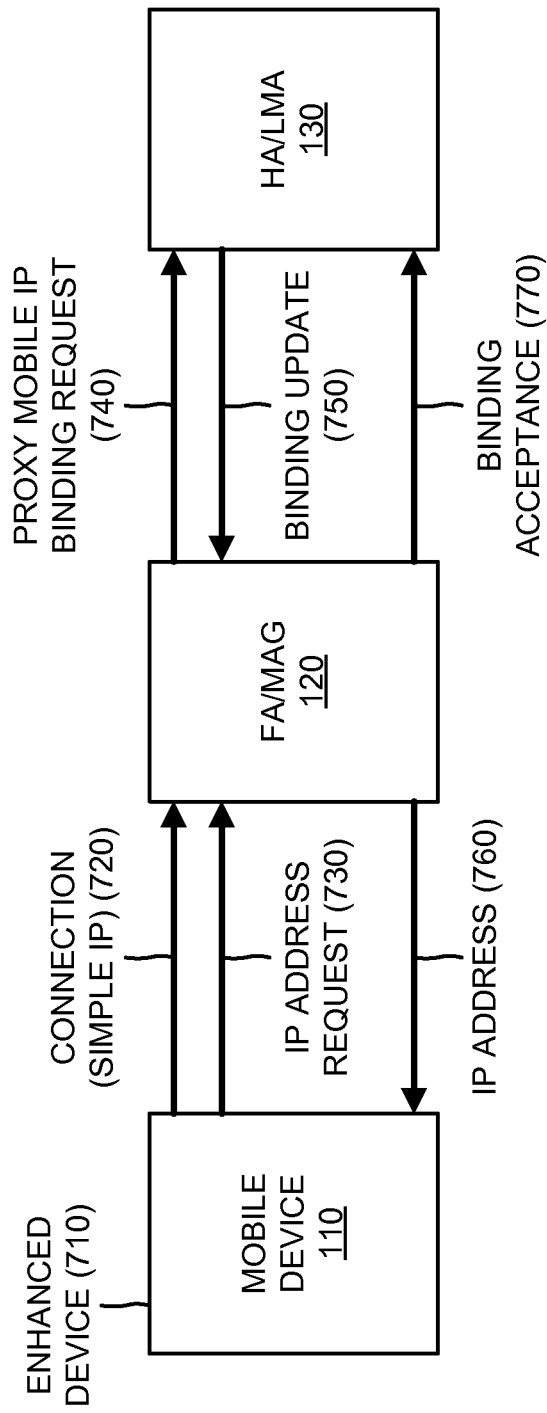
FIG. 7 is a diagram of example network-based dynamic selection operations capable of being performed by a further example portion of the network in FIG. 1.

FIGS. 6 and 7 may depict systems and/or methods that may provide for dynamic selection of a host-based mobility protocol or a network-based mobility protocol in mixed mobility networks, such as networks that implement both the CMIPv4 and PMIPv6 mobility protocols. The systems and/or methods may enable mobile device 110 and a mixed mobility network to exchange capabilities so that the mixed mobility network may select a correct type of mobility protocol for the duration of a mobile session with mobile device 110. Based on the mobility capability of mobile device 110, the mixed mobility network may either respond with a mobile advertisement (e.g., mobile advertisement message 420, FIG. 4) or a proxy Mobile IP binding request (e.g., proxy Mobile IP binding request 530, FIG. 5). The mobile advertisement may enable a legacy mobile device 110 to begin a Mobile IP registration process by sending a Mobile IP registration request. The proxy Mobile IP binding request may enable the mixed mobility network to obtain an IP address for an enhanced mobile device 110.

FIG. 6 is a diagram of example host-based dynamic selection operations capable of being performed by still another example portion 600 of network 100 (FIG. 1). As shown, network portion 600 may include mobile device 110, FA/MAG 120, and HA/LMA 130. Mobile device 110, FA/MAG 120, and HA/LMA 130 may include the features described above in connection with, for example, one or more of FIGS. 1-5.

As further shown in FIG. 6, mobile device 110 may be a legacy device 610 that provides support for only a host-based mobility protocol, such as the CMIPv4 mobility protocol. Mobile device 110 may generate a connection request 620, and may provide connection request 620 to FA/MAG 120. Connection request 620 may include a request to connect to an access network (e.g., network 140) and may not provide a mobility capability of mobile device 110 (i.e., supports Mobile IP). FA/MAG 120 may receive connection request 620, and may determine, based on connection request 620, that mobile device 110 is a legacy device without mobility capability and supporting Mobile IP. Since mobile device 110 is without mobility capability, FA/MAG 120 may not provide network capability information to mobile device 110. Instead, FA/MAG 120 may provide a Mobile IP advertisement message 630 to mobile device 110 based on connection request 620. Mobile IP advertisement message 630 may instruct mobile device 110 to perform a Mobile IP registration per the CMIPv4 mobility protocol.

Mobile device 110 may receive Mobile IP advertisement message 630, and may begin a Mobile IP registration process based on Mobile IP advertisement message 630. For example, mobile device 110 may provide a Mobile IP registration request 640 to FA/MAG 120, and FA/MAG 120 may forward Mobile IP registration request 640 to HA/LMA 130. Mobile IP registration request 640 may include a request for an IP address. HA/LMA 130 may receive Mobile IP registration request 640, and may return, to FA/MAG 120, a Mobile IP registration acceptance 650 in response to Mobile IP registration request 640. Mobile IP registration acceptance 650 may include an IP address assigned by HA/LMA 130 to mobile device 110. FA/MAG 120 may forward Mobile IP registration acceptance 650 to mobile device 110 so that mobile device 110 may receive and utilize the assigned IP address.

Although FIG. 6 shows example components of network portion 600, in other implementations, network portion 600 may include fewer components, different components, differently arranged components, or additional components than depicted in FIG. 6. Additionally, or alternatively, one or more components of network portion 600 may perform one or more other tasks described as being performed by one or more other components of network portion 600.

FIG. 7 is a diagram of example network-based dynamic selection operations capable of being performed by a further example portion 700 of network 100 (FIG. 1). As shown, network portion 700 may include mobile device 110, FA/MAG 120, and HA/LMA 130. Mobile device 110, FA/MAG 120, and HA/LMA 130 may include the features described above in connection with, for example, one or more of FIGS. 1-6.

As further shown in FIG. 7, mobile device 110 may be an enhanced device 710 that provides support for a network-based mobility protocol (e.g., the PMIPv6 mobility protocol, i.e., supports Simple IP) or provides support for a host-based mobility protocol (e.g., the CMIPv4 mobility protocol) and the network-based mobility protocol. Mobile device 110 may generate a connection request 720, and may provide connection request 720 to FA/MAG 120. Connection request 720 may include a request to connect to an access network (e.g., network 140), and may provide a mobility capability (i.e., Simple IP) of mobile device 110. FA/MAG 120 may receive connection request 720, and may determine, based on connection request 720, that mobile device 110 is an enhanced device with mobility capability. Since mobile device 110 has mobility capability, FA/MAG 120 may provide, to mobile device 110, network capability information indicating that network portion 700 supports the CMIPv4 mobility protocol and the PMIPv6 mobility protocol.

FA/MAG 120 may not send a Mobile IP advertisement message since mobile device 110 has mobility capability. Instead, FA/MAG 120 may wait for mobile device 110 to generate an IP address request. As further shown in FIG. 7, mobile device 110 may generate an IP address request 730, and may provide IP address request 730 to FA/MAG 120. In one example, IP address request 730 may be included in connection request 720. FA/MAG 120 may receive connection request 720 and IP address request 730, and may act as a proxy agent for mobile device 110 based on connection request 720 and/or IP address request 730.

For example, FA/MAG 120 may generate and provide a proxy Mobile IP binding request 740 to HA/LMA 130, based on connection request 720 and/or IP address request 730. Proxy Mobile IP binding request 740 may include a request for an IP address for mobile device 110. HA/LMA 130 may receive proxy Mobile IP binding request 740, and may return, to FA/MAG 120, a proxy Mobile IP binding update 750 in response to proxy Mobile IP binding request 740. Proxy Mobile IP binding update 750 may include an IP address 760 assigned by HA/LMA 130 to mobile device 110. FA/MAG 120 may forward IP address 760 to mobile device 110 so that mobile device 110 may utilize IP address 760. In one example, FA/MAG 120 may deliver IP address 760 to mobile device 110 using a Layer 2 (e.g., of the OSI model) method or a DHCP method. As further shown in FIG. 7, FA/MAG 120 may provide, to HA/LMA 130, a proxy Mobile IP binding acceptance 770 that provides an indication of acceptance of proxy Mobile IP binding update 750.

Although FIG. 7 shows example components of network portion 700, in other implementations, network portion 700 may include fewer components, different components, differently arranged components, or additional components than depicted in FIG. 7. Additionally, or alternatively, one or more components of network portion 700 may perform one or more other tasks described as being performed by one or more other components of network portion 700.

Figure 8:
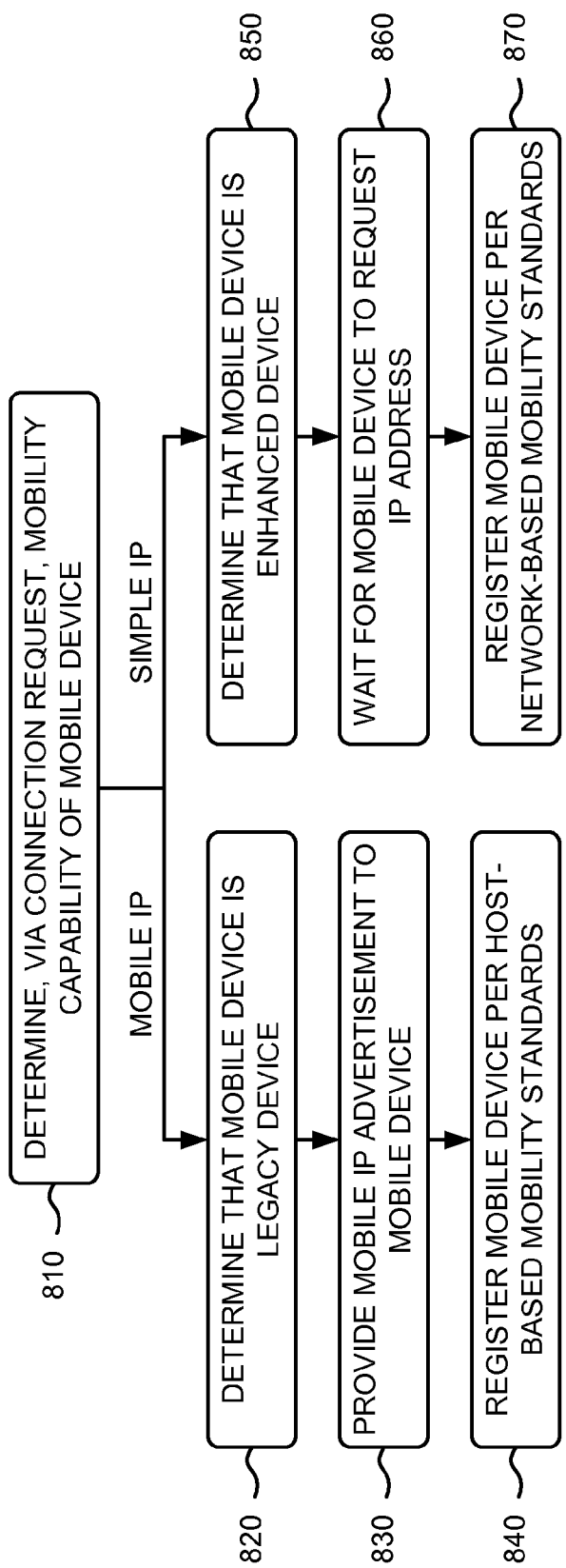
FIGS. 8-10 are flow charts of an example process for performing dynamic selection of a host-based or a network-based mobility protocol according to an implementation described herein.
Figure 9:
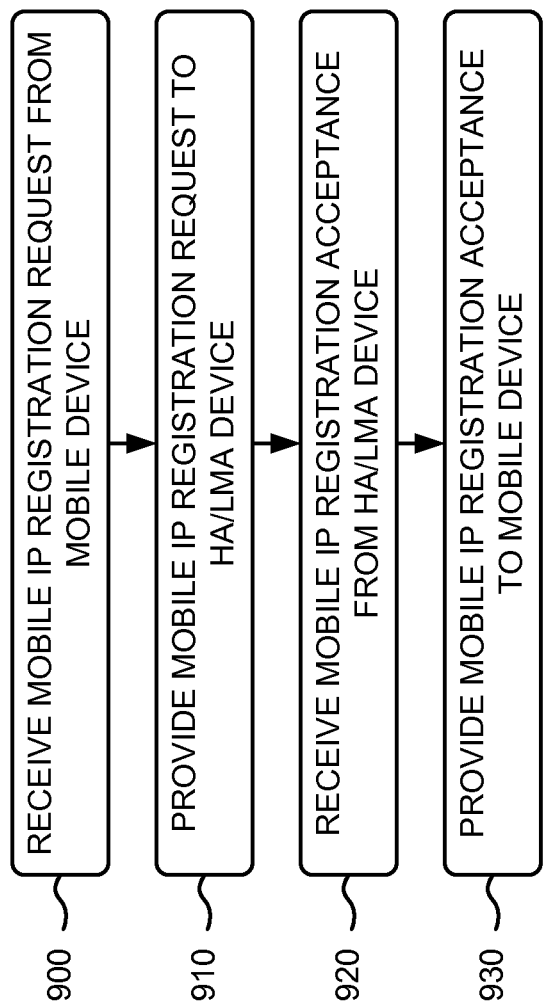
Figure 10:
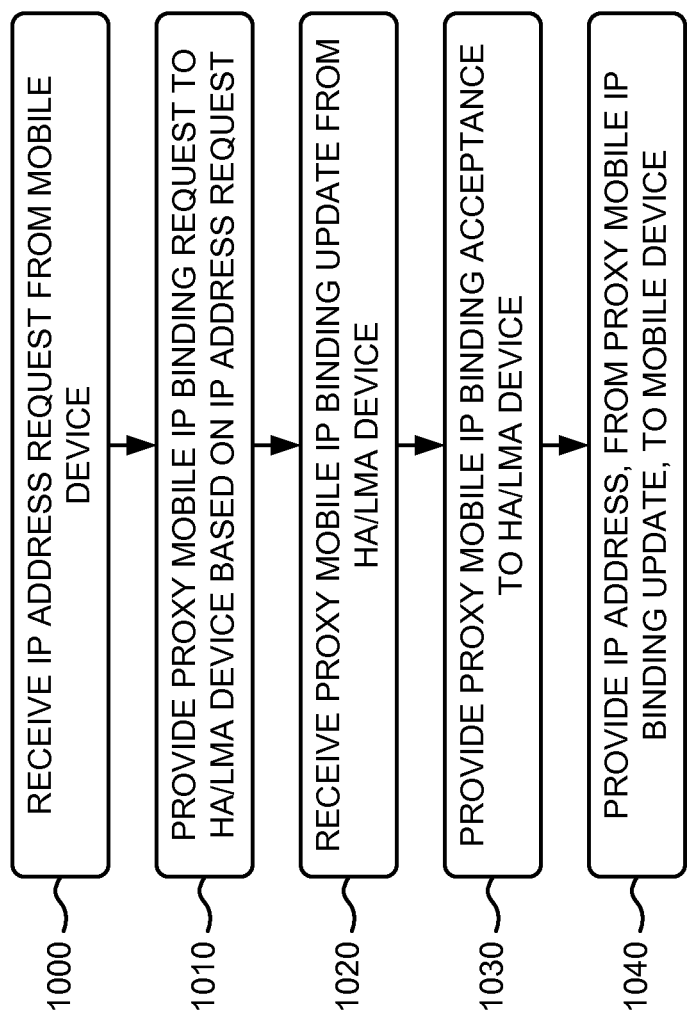

FIGS. 8-10 are flow charts of an example process 800 for performing dynamic selection of a host-based or a network-based mobility protocol according to an implementation described herein. In one implementation, process 800 may be performed by FA/MAG 120. Alternatively, or additionally, some or all of process 800 may be performed by another device or group of devices, including or excluding FA/MAG 120.

As shown in FIG. 8, process 800 may include determining, via a connection request, a mobility capability of a mobile device (block 810). For example, in an implementation described above in connection with FIG. 6, mobile device 110 may be legacy device 610 that provides support for only a host-based mobility protocol, such as the CMIPv4 mobility protocol. Mobile device 110 may generate connection request 620, and may provide connection request 620 to FA/MAG 120. Connection request 620 may include a request to connect to an access network (e.g., network 140) and may not provide a mobility capability of mobile device 110. FA/MAG 120 may receive connection request 620, and may determine, based on connection request 620, that mobile device 110 is a legacy device without mobility capability.

As further shown in FIG. 8, if the mobile device has no mobility capability and supports Mobile IP (block 810—MOBILE IP), process 800 may include determining that the mobile device is a legacy device (block 820), providing a Mobile IP advertisement to the mobile device (block 830), and registering the mobile device per host-based mobility standards (block 840). For example, in an implementation described above in connection with FIG. 6, FA/MAG 120 may receive connection request 620, and may determine, based on connection request 620, that mobile device 110 is a legacy device without mobility capability. Since mobile device 110 is without mobility capability, FA/MAG 120 may not provide network capability information to mobile device 110. Instead, FA/MAG 120 may provide Mobile IP advertisement message 630 to mobile device 110 based on connection request 620. Mobile IP advertisement message 630 may instruct mobile device 110 to perform a Mobile IP registration per the CMIPv4 mobility protocol.

Returning to FIG. 8, if the mobile device has mobility capability and supports Simple IP (block 810—SIMPLE IP), process 800 may include determining that the mobile device is an enhanced device (block 850), waiting for the mobile device to request an IP address (block 860), and registering the mobile device per network-based mobility standards (block 870). For example, in an implementation described above in connection with FIG. 7, FA/MAG 120 may receive connection request 720, and may determine, based on connection request 720, that mobile device 110 is an enhanced device with mobility capability. FA/MAG 120 may not send a Mobile IP advertisement message since mobile device 110 has mobility capability. Instead, FA/MAG 120 may wait for mobile device 110 to generate an IP address request. Mobile device 110 may generate IP address request 730, and may provide IP address request 730 to FA/MAG 120. In one example, IP address request 730 may be included in connection request 720. FA/MAG 120 may receive connection request 720 and IP address request 730, and may act as a proxy agent for mobile device 110 based on connection request 720 and/or IP address request 730.

Process block 840 may include the process blocks depicted in FIG. 9. As shown in FIG. 9, process block 840 may include receiving a Mobile IP registration request from the mobile device (block 900), providing the Mobile IP registration request to a HA/LMA device (block 910), receiving a Mobile IP registration acceptance from the HA/LMA device (block 920), and providing the Mobile IP registration acceptance to the mobile device (block 930). For example, in an implementation described above in connection with FIG. 6, mobile device 110 may provide Mobile IP registration request 640 to FA/MAG 120, and FA/MAG 120 may forward Mobile IP registration request 640 to HA/LMA 130. Mobile IP registration request 640 may include a request for an IP address. HA/LMA 130 may receive Mobile IP registration request 640, and may return, to FA/MAG 120, Mobile IP registration acceptance 650 in response to Mobile IP registration request 640. Mobile IP registration acceptance 650 may include an IP address assigned by HA/LMA 130 to mobile device 110. FA/MAG 120 may forward Mobile IP registration acceptance 650 to mobile device 110 so that mobile device 110 may receive and utilize the assigned IP address.

Process block 870 may include the process blocks depicted in FIG. 10. As shown in FIG. 10, process block 870 may include receiving an IP address request from the mobile device (block 1000), and providing a proxy Mobile IP binding request to the HA/LMA device based on the IP address request (block 1010). For example, in an implementation described above in connection with FIG. 7, mobile device 110 may generate IP address request 730, and may provide IP address request 730 to FA/MAG 120. In one example, IP address request 730 may be included in connection request 720. FA/MAG 120 may receive connection request 720 and IP address request 730, and may act as a proxy agent for mobile device 110 based on connection request 720 and/or IP address request 730. FA/MAG 120 may generate and provide proxy Mobile IP binding request 740 to HA/LMA 130, based on connection request 720 and/or IP address request 730. Proxy Mobile IP binding request 740 may include a request for an IP address for mobile device 110.

As further shown in FIG. 10, process block 870 may include receiving a proxy Mobile IP binding update from the HA/LMA device (block 1020), providing a Mobile IP binding acceptance to the HA/LMA device (block 1030), and providing an IP address, from the proxy Mobile IP binding update, to the mobile device (block 1040). For example, in an implementation described above in connection with FIG. 7, HA/LMA 130 may receive proxy Mobile IP binding request 740, and may return, to FA/MAG 120, proxy Mobile IP binding update 750 in response to proxy Mobile IP binding request 740. Proxy Mobile IP binding update 750 may include IP address 760 assigned by HA/LMA 130 to mobile device 110. FA/MAG 120 may forward IP address 760 to mobile device 110 so that mobile device 110 may utilize IP address 760. FA/MAG 120 may provide, to HA/LMA 130, proxy Mobile IP binding acceptance 770 that provides an indication of acceptance of proxy Mobile IP binding update 750.

Systems and/or methods described herein may provide for dynamic selection of a host-based or a network-based mobility protocol in mixed mobility environments, such as networks that implement both the CMIPv4 and PMIPv6 mobility protocols. The systems and/or methods may enable a mobile device and a network to exchange mobility capabilities so that the network may select a correct type of mobility protocol for the duration of a mobile session with the mobile device.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 8-10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a device, a connection request from a mobile device;
   determining, by the device and based on the connection request, whether the mobile device has mobility capability;
   providing a Mobile Internet protocol (IP) advertisement to the mobile device in response to determining that the mobile device does not have the mobility capability;
   registering, by the device, the mobile device per host-based mobility protocol standards based on the Mobile IP advertisement, in response to determining that the mobile device does not have the mobility capability; and
   registering, by the device, the mobile device per network-based mobility protocol standards in response to determining that the mobile device has the mobility capability,
   wherein registering the mobile device per host-based mobility protocol standards includes:
      receiving a Mobile IP registration request from the mobile device based on the Mobile IP advertisement,
      providing the Mobile IP registration request to a home agent (HA)/local mobility anchor (LMA) device;
      receiving a Mobile IP registration acceptance from the HA/LMA device, and
      providing the Mobile IP registration acceptance to the mobile device.

2. The method of claim 1, where the host-based mobility protocol standards include Client Mobile IP version 4 CMIPv4) mobility protocol standards.

3. The method of claim 1, where the network-based mobility protocol standards include proxy IP version 6 PMIPv6) mobility protocol standards.

4. The method of claim 1, comprising:
   in response to determining that the mobile device does not have mobility capability, determining that the mobile device is a legacy device configured to handle host-based mobility protocol standards.

5. The method of claim 1, where, comprising:
   in response to determining that the mobile device has mobility capability, determining that the mobile device is an enhanced device configured to handle network-based mobility protocol standards.

6. The method of claim 1, where the Mobile IP registration acceptance includes an IP address to be used by the mobile device.

7. The method of claim 1, where registering the mobile device per network-based mobility protocol standards further comprises:
   receiving an IP address request from the mobile device;
   providing a proxy Mobile IP binding request to a home agent (HA)/local mobility anchor (LMA) device based on the IP address request;
   receiving a proxy Mobile IP binding update from the HA/LMA device based on the proxy Mobile IP binding request; and
   providing an IP address, from the proxy Mobile IP binding update, to the mobile device.

8. The method of claim 7, further comprising:
providing a proxy Mobile IP binding acceptance to the HA/LMA device in response to the proxy Mobile IP binding update.

9. A device, comprising: a processor to:
receive, from a mobile device, a request to connect to a network,
determine, based on the connection request, whether the mobile device has mobility capability,
provide a Mobile Internet protocol (IP) advertisement to the mobile device in response to determining that the mobile device does not have the mobility capability,
register the mobile device per host-based mobility protocol standards based on the Mobile IP advertisement, in response to determining that the mobile device does not have the mobility capability, and
register the mobile device per network-based mobility protocol standards in response to determining that the mobile device has the mobility capability,
wherein when registering the mobile device per host-based mobility protocol standards, the processor is further to:
receive a Mobile IP registration request from the mobile device based on the Mobile IP advertisement,
provide the Mobile IP registration request to a home agent (HA)/local mobility anchor (LMA) device,
receive a Mobile IP registration acceptance from the HA/LMA device, and
provide the Mobile IP registration acceptance to the mobile device, where the Mobile IP registration acceptance includes an IP address to be used by the mobile device.

10. The device of claim 9, where:
the host-based mobility protocol standards include Client Mobile IP version 4 (CMIPv4) mobility protocol standards, and
the network-based mobility protocol standards include proxy Mobile IP version 6 (PMIPv6) mobility protocol standards.

11. The device of claim 9, where the processor is further to:
determine that the mobile device is a legacy device configured to handle host-based mobility protocol standards, in response to determining that the mobile device does not have the mobility capability.

12. The device of claim 9, where the processor is further to:
determine that the mobile device is an enhanced device configured to handle network-based mobility protocol standards, in response to determining that the mobile device has the mobility capability.

13. The device of claim 9, where, when registering the mobile device per network-based mobility protocol standards, the processor is further to:
receive an IP address request from the mobile device,
provide a proxy Mobile IP binding request to a home agent (HA)/local mobility anchor (LMA) device based on the IP address request,
receive a proxy Mobile IP binding update from the HA/LMA device based on the proxy Mobile IP binding request,
provide an IP address, from the proxy Mobile IP binding update, to the mobile device, and
provide a proxy Mobile IP binding acceptance to the HA/LMA device in response to the proxy Mobile IP binding update.

14. The device of claim 9, where the device comprises a foreign agent (FA)/mobile access gateway (MAG) device.

15. A non-transitory computer-readable medium, comprising:
one or more instructions that, when executed by a processor, cause the processor to:
receive a connection request from a mobile device,
determine, based on the connection request, whether the mobile device has mobility capability,
provide a Mobile Internet protocol (IP) advertisement to the mobile device in response to determining that the mobile device does not have mobility capability,
register the mobile device per host-based mobility protocol standards based on the Mobile IP advertisement, in response to determining that the mobile device does not have mobility capability, and
register the mobile device per network-based mobility protocol standards in response to determining that the mobile device has mobility capability,
wherein when registering the mobile device per host-based mobility protocol standards, the computer-readable medium further comprises
one or more instructions that, when executed by the processor, cause the processor to:
receive a Mobile IP registration request from the mobile device based on the Mobile IP advertisement,
provide the Mobile IP registration request to a home agent (HA)/local mobility anchor (LMA) device,
receive a Mobile IP registration acceptance from the HA/LMA device, and
provide the Mobile IP registration acceptance to the mobile device, where the Mobile IP registration acceptance includes an IP address to be used by the mobile device.

16. The non-transitory computer-readable medium of claim 15, where:
the host-based mobility protocol standards include Client Mobile IP version 4 (CMIPv4) mobility protocol standards, and
the network-based mobility protocol standards include proxy Mobile IP version 6 (PMIPv6) mobility protocol standards.

17. The non-transitory computer-readable medium of claim 15, further comprising:
one or more instructions that, when executed by the processor, cause the processor to:
determine that the mobile device is a legacy device in response to determining that the mobile device does not have mobility capability.

18. The non-transitory computer-readable medium of claim 15, further comprising:
one or more instructions that, when executed by the processor, cause the processor to:
determine that the mobile device is an enhanced device in response to determining that the mobile device has mobility capability.

19. The non-transitory computer-readable medium of claim 15, where, when registering the mobile device per network-based mobility protocol standards, the computer-readable medium further comprises:
one or more instructions that, when executed by the processor, cause the processor to:
receive an IP address request from the mobile device,
provide a proxy Mobile IP binding request to a home agent (HA)/local mobility anchor (LMA) device based on the IP address request,
receive a proxy Mobile IP binding update from the HA/LMA device based on the proxy Mobile IP binding request, and provide an IP address, from the proxy Mobile IP binding update, to the mobile device.

20. A method, comprising:

receiving, by a device, a connection request from a mobile device;

determining, by the device and based on the connection request, whether the mobile device has mobility capability;

providing a Mobile Internet protocol (IP) advertisement to the mobile device in response to determining that the mobile device does not have the mobility capability;

registering, by the device, the mobile device per host-based mobility protocol standards based on the Mobile IP advertisement, in response to determining that the mobile device does not have the mobility capability; and registering, by the device, the mobile device per network-based mobility protocol standards in response to determining that the mobile device has the mobility capability, wherein registering the mobile device per network-based mobility protocol standards includes:
  receiving an IP address request from the mobile device;
  providing a proxy Mobile IP binding request to a home agent (HA)/local mobility anchor (LMA) device based on the IP address request;
  receiving a proxy Mobile IP binding update from the HA/LMA device based on the proxy Mobile IP binding request; and
  providing an IP address, from the proxy Mobile IP binding update, to the mobile device.

* * * * *